Sept. 19, 1961 R. H. MALCOMB 3,000,440
DEEP WELL ORIENTING TOOL
Filed April 29, 1957 4 Sheets-Sheet 1
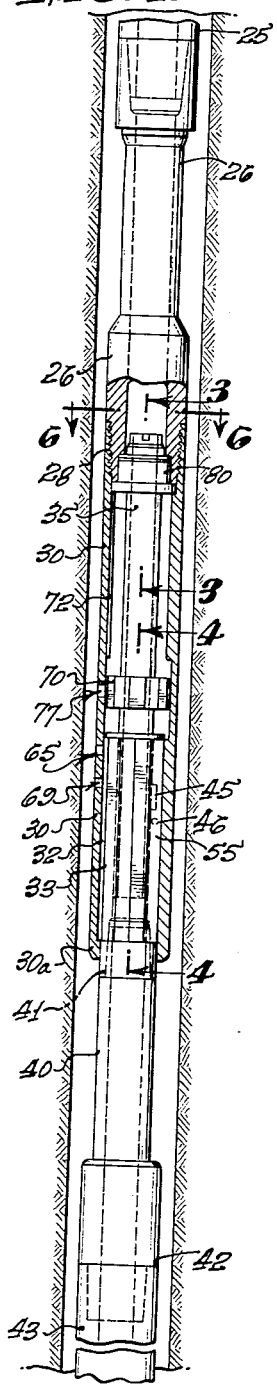
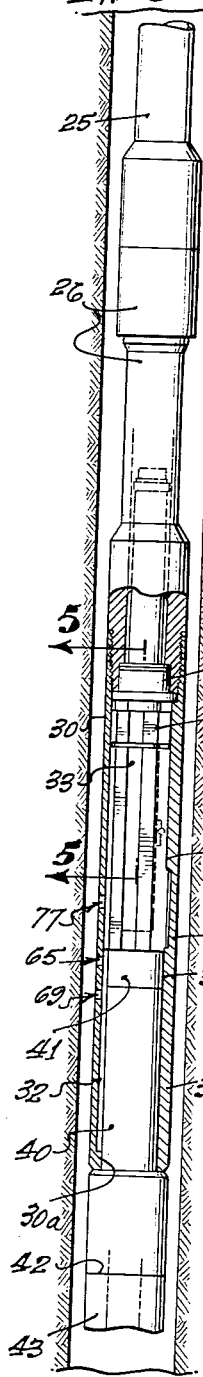
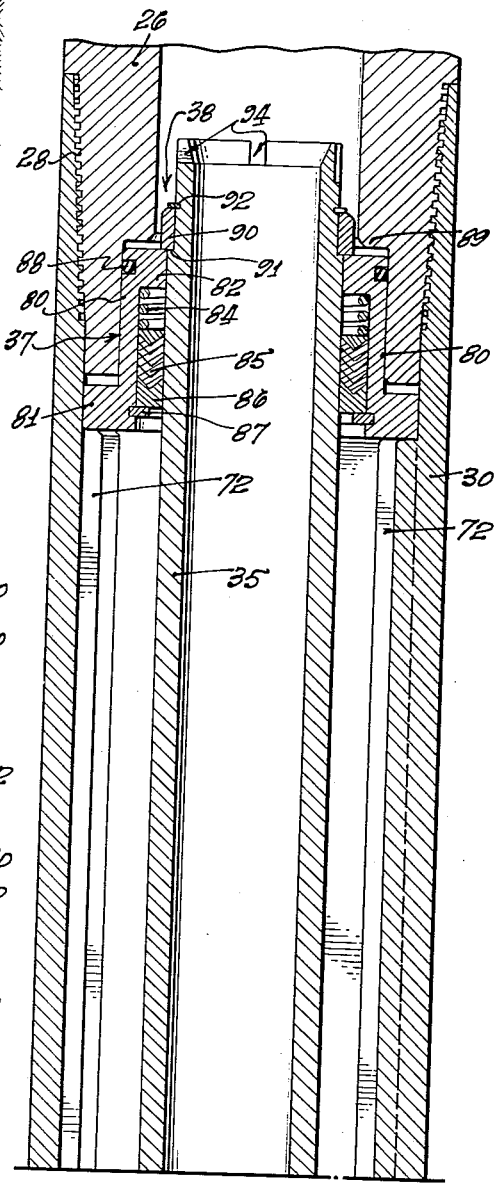
ROBERT HOWARD MALCOMB,
INVENTOR.
By His Attorneys
HARRIS, KIECH, FOSTER & HARRIS.

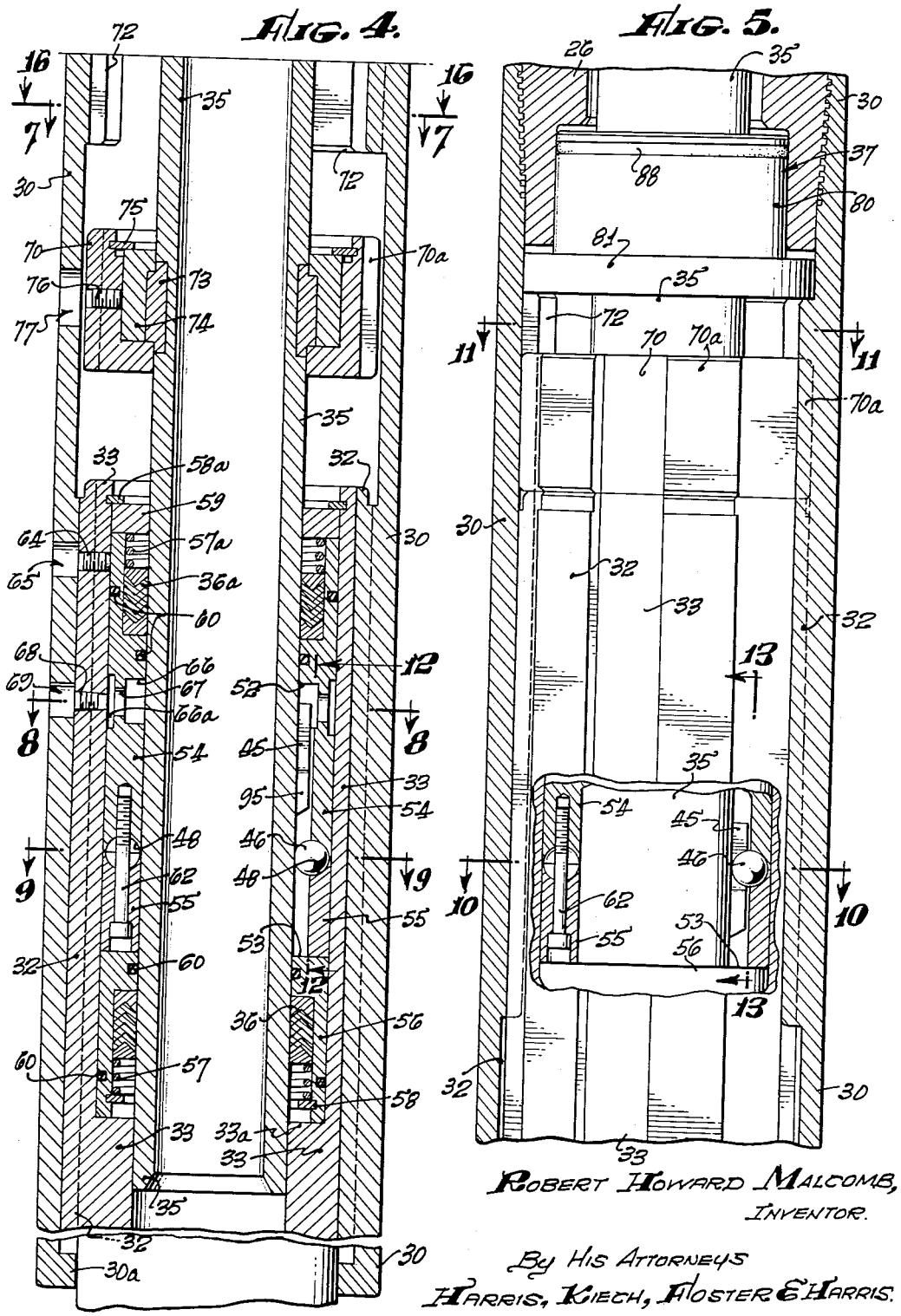

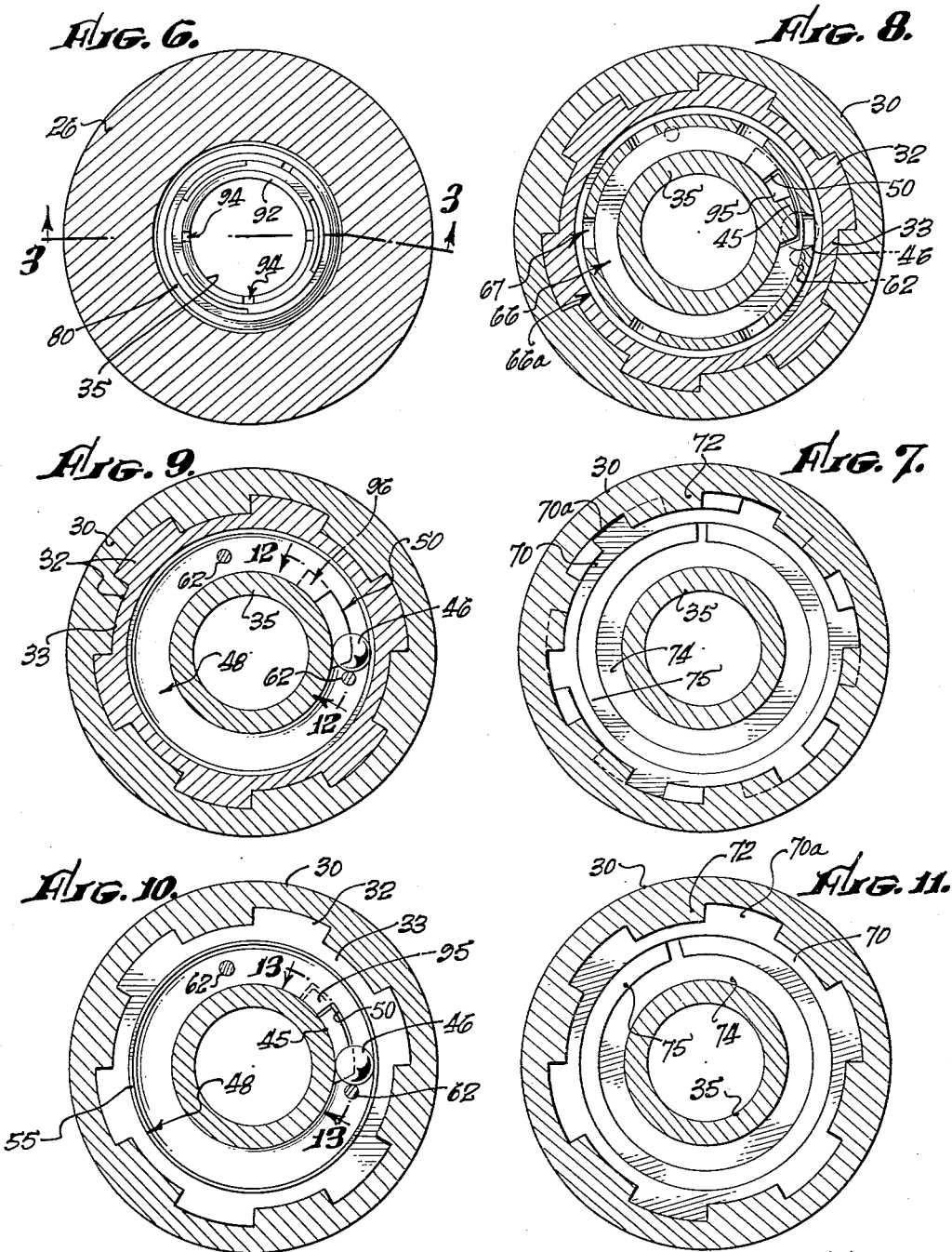

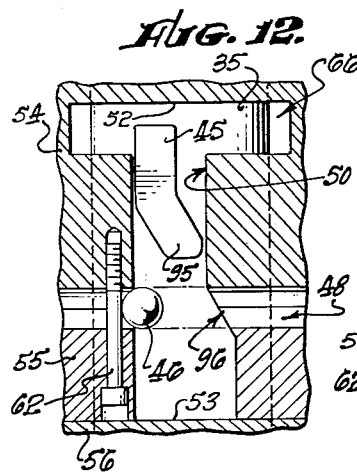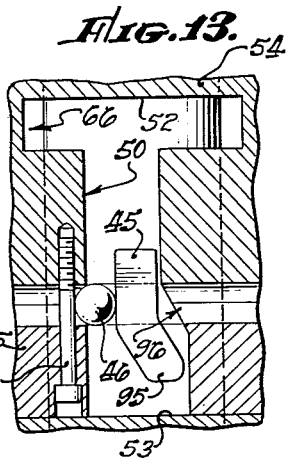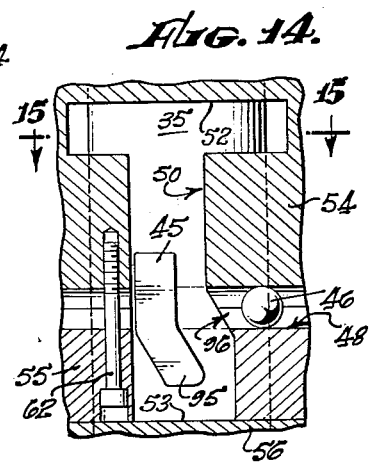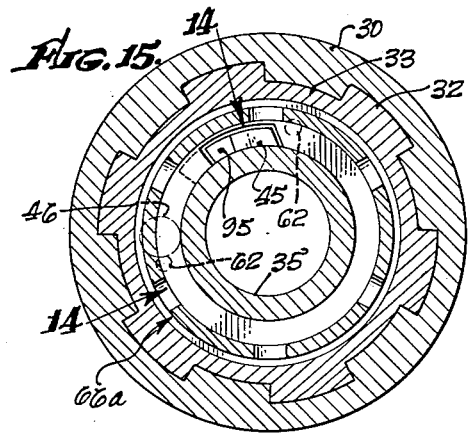

United States Patent Office 3,000,440
Patented Sept. 19, 1961

3,000,440
DEEP WELL ORIENTING TOOL
Robert Howard Malcomb, Ventura, Calif., assignor to Regan Forge and Engineering Company, San Pedro, Calif., a corporation of California
Filed Apr. 29, 1957, Ser. No. 655,742
8 Claims. (Cl. 166—4)

This invention relates to tools for deep wells, such as oil wells, for directional orientation where it is desired to straighten a hole if inclined, or to initiate slant drilling from an angular or nearly straight hole when desired, this application being a continuation-in-part of my application Serial No. 508,988, filed May 17, 1955, and now abandoned.

An object of the invention is to provide an orienting tool which may be used in an inclined deep well hole for whipstocking or straightening the hole, which tool shall be relatively easy to operate.

Another object of the invention is to provide an orienting tool, especially such a tool for deep wells, with which, when the tool is positioned near the bottom of the inclined hole, orientation may be effected by the simple procedure of alternately raising and lowering ("stabbing") a supporting length of drill pipe at the surface and alternately (after each raising) rotating such drill pipe at the surface through successive rotational increments, such as 5° or 15° increments, until orientation is definitely determined.

Another object of the invention is to provide an orienting tool for deep wells whereby to establish required directional drilling which is not only relatively simple of operation but relatively simple of construction.

A still further object of the invention is to provide an orienting tool with which the direction in which a deflecting tool is required to operate may be quickly determined.

It is additionally an object to provide an orienting tool in which orienting operations may be continuously repeated as desired, whereby to check the accuracy of the orientation determination, whereby the tool may be readily reset, and whereby a great saving of time is effected in making orientation determinations.

A still further object of the invention is therefore to provide an orienting tool which may be used directly for orientation, without the necessity for wire-line operations, and with consequent saving in time required by running wire lines and instruments thereon.

It is a still further object of the invention to provide an orienting combination which primarily requires, in addition to conventional drill pipe, short connectors or "subs," and deflecting tools or bits, an orienting tool which includes an outer mandrel, an inner barrel sliding therein for limited telescopic movement, an actuating ball rolling to a limited extent within an otherwise normally horizontal groove, a wash pipe having a cam actuated by such ball, and an orienting ring on said wash pipe shiftable by the cam-and-ball actuation to spline-aligning position permitting additional vertical downward movement (sometimes herein called "stabbing") which signifies attainment of orientation. It is also an object to provide in such an orienting tool means for automatically resetting or recocking the orienting tool following completion of an orienting cycle.

Other objects of the invention, and various features of the construction and operation of a preferred form of the invention, will become apparent to those skilled in the construction and use of oil well drilling tools upon reference to the following specification and the accompanying drawings.

In the drawings:

FIG. 1 is principally a longitudinal vertical elevation, parts, however, being shown in section, of a lower portion of an oil well drill pipe assembly equipped with the present improvement, the upper end of the orienting assembly being tipped to the right in indication of angle drilling often encountered in deep wells and usually desired to be corrected, a rolling ball moving under the influence of gravity being shown at the low side of a normally horizontal groove, the parts of the orienting tool being in their extended position;

FIG. 2 is a view similar to that of FIG. 1, the parts however being collapsed at the end of a stabbing operation employed in the orienting procedure;

FIG. 3 is an enlarged vertical sectional detail taken approximately as indicated by the line 3—3 of FIG. 1;

FIG. 4 is a view like that of FIG. 3 taken at a lower position indicated by the line 4—4 of FIG. 1;

FIG. 5 is a fragmentary vertical sectional view similar to those of FIGS. 3 and 4, and indicated by the line 5—5 of FIG. 2;

FIG. 6 is a cross section taken on the line 6—6 of FIG. 1;

FIGS. 7, 8 and 9 are cross sections taken respectively on the lines 7—7, 8—8 and 9—9 of FIG. 4;

FIGS. 10 and 11 are cross sections taken respectively on the lines 10—10 and 11—11 of FIG. 5;

FIGS. 12, 13 and 14 are vertical sectional and elevational details taken on the lines 12—12, 13—13 and 14—14 of FIGS. 9, 10 and 15, respectively;

FIG. 15 is a cross section similiar to those of FIGS. 9 and 10, as indicated by the line 15—15 of FIG. 14;

FIG. 16 is a cross section taken at the line 16—16 of FIG. 4, but showing a rotational position somewhat different from that of FIG. 7 taken on the same line; and FIG. 17 is a cross section similar to that of FIG. 15 showing a short groove receiving the actuating ball and providing integral stops for the ball at the ends of the groove, this figure additionally indicating a modified spline arrangement.

Referring to FIGS. 1 to 4, in particular, these drawings disclose a deep well tool assembly in which the lower end of a string of drill pipe 25 carries a typical coupling or so-called upper "sub" or short connector pipe 26 whose lower end is attached by a standard threaded tool joint 28 to the upper end of the present improvement which includes an outer sleeve or mandrel 30 whose lower end slides, through the medium of splines 32, upon an inner mandrel or barrel 33 between the extended position of FIG. 1 and the contracted position of FIG. 2. The lower end of the mandrel 30 is provided with an inwardly directed flange or collar 30a which underlies the lower ends of the splines 32 on the barrel 33 and prevents separation of the barrel 33 from the mandrel 30. Within the barrel 33, and extending upward through the mandrel 30 into the upper sub 26 is a wash pipe 35 which is packed at its lower end within the barrel 33 by suitable packing such as generally indicated at 36, FIG. 4, and is packed at its upper end within the upper end of the mandrel 30 and the lower end of the sub 26 by appropriate packing means generally indicated at 37, FIG. 3. A stop ring combination 38, FIG. 3, prevents the upper end of the wash pipe 35 from pulling out of the packing 37 and the lower end of the sub 26. To the lower end of the barrel 33, below the wash pipe 35, there is secured a lower sub 40 or pipe by means of a standard threaded tool joint 41, and in practice the lower end of the sub 40 carries, through another threaded tool joint 42, a drill bit or whipstock 43 or the like which may be raised from the bottom of the hole by lifting the drill pipe 25 to pull the mandrel 30 up to the extended position of FIG. 1 and FIG. 4 and then to lift the whipstock 43.

The orienting means of this improvement principally includes a projecting cam 45 fixed on the outer side of a lower portion of the wash pipe 35, and a gravity responsive element, preferably a ball 46, which runs in an orienting groove or ball race 48 located in a plane transverse to the axis of the tool and formed in inner members of the barrel 33, as presently to be more fully described.

The cam 45 works in a relatively narrow vertical slot or groove 50 (see especially FIGS. 12, 13 and 14) which cuts across the corresponding inner half of the ball groove 48. The cam 45 is very slightly shallower than the cam groove 50 (see FIGS. 8 and 10 e.g.), and the groove 50 is very slightly shallower than or equal to half the diameter of the ball 46. When the cam 45 clears the ball groove 48 the ball 46 may still roll in the remaining half of its groove 48 and across the cam groove 50, the innermost position of the ball 46 freely contacting the adjacent wall of the wash pipe 35. The cam 45 is in the nature of a lug which may be welded to the wash pipe to work in the slot 50.

When the parts are lowered into the well hole as indicated in FIG. 1, the lower sub 40 and bit or deflection tool 43 draw the inner mandrel or barrel 33, together with the wash pipe 35, down in the outer mandrel 30 to their lowermost positions so that the lower ends of the splines 32 of the barrel 33 rest upon the top of the inwardly directed collar 30a of the outer mandrel 30. This is also the position of FIG. 4, as well as that of FIG. 1. In this position the cam 45 on the exterior of the wash pipe 35 (see FIGS. 4 and 12) is located above the annular orienting groove 48 and between an upper limiting shoulder or wall 52 at the top of the cam groove 50 and a lower limiting wall 53 at the bottom of the cam groove 50. Half of the circular ball-receiving groove 48 is formed at the lower end of a sleeve or cylindrical ring 54, this ring 54 providing the upper shoulder or limiting wall 52. The lower half of the groove 48 receiving the ball 46 is formed in the upper end of a lower sleeve or cylindrical ring 55. The lower end of the ring 55 abuts against the upper end of a ring 56 whose top wall provides the lower limiting wall 53 and whose middle portion receives the previously mentioned packing 36.

In the form illustrated this packing 36 is pressed against an overhanging upper portion of the ring 56 as by a coil spring 57 whose lower end bears on an internal snap ring 58 in the lower end of the ring 56. The lower end of the ring 56 rests upon an upwardly facing shoulder 33a of the barrel 33. The ring 54 extends above the mentioned shoulder 52 and carries in its upper portion an additional packing unit 36a which is in turn compressed by a coil spring 57a positioned by a positioning ring 59 which is in turn retained by a snap ring 58a inside the top of the barrel 33. In the form illustrated further packing means 60 are shown in the inner and outer walls of the rings 54 and 55 providing the ball race or groove 48 for the ball 46. These packings 60 may be in the form of O-rings.

After installing the actuating ball 46 in the groove 48, the rings 54 and 55 are retained by vertically disposed headed screws 62 which are conveniently located to perform the further function of serving as stops for the ball 46 at the respective ends of its path of travel in the groove 48 (see FIG. 10). These screws 62 also prevent relative rotation of the rings 54 and 55 with respect to each other. Rotation of the ring 54 within the barrel 33 is prevented by means of a set screw 64 in the barrel 33, an access hole 65 being provided in the mandrel 30 for placing or removing the set screw 64.

For lubrication of the wash pipe 35, which has limited rotary movement and limited vertical movement within the inner members carried by the barrel 33, and to fill the adjoining ball and cam grooves 48 and 50 with lubricant, an annular passage 66 is provided in the inner wall of the sleeve or ring member 54 at the top of the vertical cam slot or groove 50. Access ports 67 lead through the wall of the sleeve or ring member 54 to receive lubricating fluid supplied through a port normally filled by a plug 68 in the wall of the barrel 33, access to such plug being had through an access opening 69 in the mandrel 30. If desired, an outer annular groove 66a may be provided in the outer wall of the sleeve or ring 54 from which lubricant may pass to the ports 67.

Fixed on the wash pipe 35 immediately above the barrel 33 is an interrupter ring 70 which, in the previously mentioned stabbing operations, moves only between the upper end of the barrel 33 and the lower ends of splines 72 in the upper portion of the mandrel 30, unless the interrupter ring 70 has been oriented by the wash pipe 35 through the action of the cam 45 and the ball 46 to bring splines 70a on the interrupter ring 70 into alignment with ways between the splines 72. In the event of such alignment, the oriented interrupter ring 70 and the wash pipe 35 then move relative to the mandrel 30 into its upper portion within the splines 72 from the position of FIGS. 1 and 4 to the position of FIGS. 2 and 5, as more fully hereinafter explained. Thus, the interrupter ring 70 acts as a stop ring or means for limiting relative longitudinal movement of the mandrel 30 and the barrel 33 to a minimum in one angular position of the wash pipe 35.

The splined interrupter ring 70 is fixed on the wash pipe 35 through the medium of keys 73 which are fixed in large slots and receive and anchor a positioning ring 74 over which the interrupter ring 70 which is shouldered at its lower end is moved to the position illustrated in FIG. 4, the indicated assembly of these parts being maintained by a snap ring 75 which fits into an inner ring groove in the upper end of the interrupter 70 and overhangs the positioning ring 74. The interrupter ring 70 is anchored on the positioning ring 74 by means of a set screw 76 insertable by way of an access hole 77 in the adjacent wall of the mandrel 30.

When the wash pipe 35 is rotated through the action of the orienting ball 46 against the cam 45, the interrupter ring 70 is correspondingly rotated, and its splines 70a are aligned with the spline ways between the elongated splines 72 in the upper portion of the mandrel 30, so that the interrupter ring may ride up into the upper portion of the mandrel 30 within the splines 72 as indicated in FIGS. 2 and 5.

The wash pipe 35 is sealed relative to the mandrel 30 and the tool joint on the lower end of the upper sub 26 by the packing means 37 previously mentioned. This packing means includes a shouldered retainer 80 (FIG. 3) having an outwardly directed lower annular flange 81 that is received between the upper ends of the splines 72 of the mandrel 30 and the lower end of the threaded tool joint of the sub 26, a limited amount of play being provided if desired. The upper end of the retainer 80 has an inwardly directed annular flange 82 whose under side provides a bearing for a coiled compression spring 84 that in turn bears upon the top of an annular packing body 85 seated upon a packing ring 86 retained by an internal snap ring 87 snapped into a corresponding internal groove in the inner wall at the lower end of the retainer 80. The exterior wall of the retainer 80 is sealed relative to an inner wall of the sub 26 as by means of an O-ring 88. In the form shown, the upper end of the retainer 80 is partially received under a shoulder 89 of the sub 26.

The wash pipe 35 is movable through the packing means 37 up into the bore of the sub 26, as indicated in FIGS. 2 and 5. Downward movement of the wash pipe 35 is limited by the previously mentioned stop ring combination 38. This includes a striking ring 90, which may hereinafter be referred to as a "cocking" ring which rests upon an external shoulder 91 on the upper end of the wash pipe 35 and overhangs the same so as to strike upon the inner annular portion of the upper flange 82 of the packing retainer 80. To prevent upward movement of the cocking ring 90 on the wash pipe 35, a snap ring 92 bears upon the top of the ring 90 and is received in a corresponding annular groove in the outer wall of the upper end portion of the wash pipe 35. The latter is provided with suitable notches or grooves 94 for reception of a setting tool as described below.

In order to provide for automatic return of the wash pipe 35 and its cam 45 to its original or "cocking" position upon return of the parts to their initial positions of FIGS. 1 and 4, the lower part of the cam 45, which is generally vertically elongated, is provided with a laterally inclined offset foot 95 (FIGS. 12, 13 and 14) whose outer lower corner normally rides against the adjacent wall of the cam slot or groove 50 while the opposite side of the cam 45 rides against the opposite wall of the groove 50. The over-all width of the cam 45 is nearly as great as the over-all width of the upper portion of the cam slot 50 so that, when the ball 46 is in the orienting position against the respective stop screw 62, the cam 45 must move laterally to the position of FIG. 13 as the cam moves downwardly in the cam slot. To produce such lateral movement of the cam 45, the lower portion of that wall of the cam slot 50 which is engaged by the foot 95 is sloped downward and laterally at 96 to receive and guide the cam foot 95 when deflected by the ball 46. This slope or cam 96 cuts across the ball race or groove 48. The lower portion of the cam slot 50 thus is correspondingly and appreciably wider than its upper portion. The inclinations of the camming wall portion 96 and of the two opposite sides of the cam foot 95 are at substantially the same angles.

Thus, when the cam 45 is moved downward with respect to the walls of the cam slot 50, and the ball 46 is in the position of FIGS. 12 and 13, the ball causes lateral movement of the cam 45 by reason of engagement of the adjacent sloping wall of the cam foot 95 with the ball, and the wash pipe 35 which carries the cam 45 is correspondingly rotated. As illustrated, this may be about 15° to the right, the cam 45 then assuming the position of FIG. 13. When the cam 45 and the wash pipe 35 are raised relative to the cam slot 50 and back to the position of FIG. 12, the sloping cam wall portion 96 causes the cam 45 to be rotated to return back to the position of FIG. 12, thus "cocking" the wash pipe 35 and cam 45 for the next stabbing operation. Such cocking action is actually effected by the striking of the previously described cocking ring 90 (FIG. 3) on the top of the packing retainer 80 in the top of the mandrel 30 and the bottom of the upper sub 26.

If the orienting ball 46 is in some other position than that of FIGS. 12 and 13, such as the position of FIG. 14, where it is not engaged by the cam 45 on relative descent of the latter, the cam 45 moves straight down in the cam slot 50 to the position of FIG. 14 and there is no rotation or orientation of the wash pipe 35. Such amount of movement is represented by the space between the upper side of the interrupter ring 70 and the bottom of the splines 72 on the inner upper wall of the mandrel 30. This is the situation when the interrupter ring 70 has not been oriented by rotation of the cam 45 and the wash pipe 35 to enter the splines 72. However, when the ball 46 is in the orienting position of FIGS. 12 and 13 and rotates the cam 45 and the wash pipe 35 to orienting position so that the splines 70a of the interrupter ring 70 will enter the spline ways between the upper mandrel splines 72, the splines 32 of the barrel 33, which are permanently aligned with the spline ways between the upper splines 72, will travel up into the upper splines 72 a considerable distance (for example one foot) until the upper end of the interrupter ring 70 strikes the retainer ring 80. This extra movement is a signal at the surface that the cam and wash pipe have been oriented.

While the effective length of the ball race or groove 48 is illustrated in the preferred form as being about 120° between the limiting screws 62, it may sometimes be advantageous to use a groove 48a which is 180° in length as indicated in FIG. 17. As also here indicated, it may be desirable that the ends of the groove be closed off to provide integral stop shoulders 98. Again, as further indicated in FIG. 17, the groove 48 may be a half groove on which the outer half of the ball seats, the inner wall of the ball traveling along the adjacent outer wall of the wash pipe 35. FIG. 17 also shows that only a few splines 32 may be used as compared with the greater number of other figures. It is to be appreciated that these structures may be built so that rotation in connection with stabbing operations is to the left or counterclockwise, rather than to the right or clockwise as herein described.

*Operation*

In connection with the operation of the tool of this improvement, the well in which it is to be used will have previously been surveyed in any well known manner to determine the direction of inclination of the inclined hole and the degree of inclination. The present tool is then installed on the lower end of the drill string 25 in conjunction with the attached whipstock 43, whereby deflection drilling may be initiated in any desired direction with respect to the direction of inclination of the original hole. This may be for the purpose of straightening the original hole or of slant drilling in some particular direction as is often desired.

The whipstock 43 is of course attached to the lower sub 40 at the surface, the assembly of the mandrel 30, the barrel 33 splined thereon, the wash pipe 35 and the upper sub 26 being applied to the lower sub 40 as previously described. In assembling the tool, a well known "setting tool" or setting plug is used to position directionally the wash pipe 35 and its cam 45 with predetermined azimuth relative to the working face of the whipstock. Such setting tool has lateral lugs which are introduced into the slots 94 at the upper end of the wash pipe 35 to effect the required position. For this purpose the set screws 64 and 76 are loosened and tightened as required to accomplish and maintain the desired setting, the set screw 76 being finally tightened with the splines 70a on the interrupter ring 70 out of register with the ways between the splines 72 when the cam 45 is in the position of FIGS. 12 and 14. The drill string 25 is then assembled progressively and the tool progressively lowered according to standard or preferred practice.

When the whipstock 43 is first set on the bottom of the hole, the actuating or orienting ball 46 either lies at the lowest point in the ball race or groove 48, or rests against one of the stop screws 62. For convenience, it will be assumed that the lowest point in the race 48 is to the right of the cam slot 50, as viewed in FIGS. 12 to 14, and between the screws 62, whereupon the ball 46 lies to the right of the cam slot and between the screws, as shown in FIG. 14. With the ball 46 in such a position relative to the cam slot 50, a lowering or "stabbing" operation, produced by lowering the pipe string 25 and the mandrel 30, will result in free descent of the cam 45 in the cam slot 50 as represented by FIG. 14, such descent of the cam 45 resulting from the fact that the wash pipe 35, on which the cam 45 is mounted, moves downwardly under the influence of gravity as the stabbing operation is performed. Therefore, since the cam 45 does not engage the ball 46, no rotation of the cam 45 and consequent rotation of the wash pipe 35 will result, and no rotation or orientation of the stop ring or interrupter ring 70 will take place. Consequently, the interrupter ring 70 will strike the bottoms of the splines 72 in the upper portion of the mandrel 30 and no further descent of the mandrel 30 will occur. In general, if the ball 46 lies in any other position than that represented in FIGS. 12 and 13, the cam 45 will descend to the position of FIG. 14 without making contact with the actuating ball 46. Under such circumstances the drill string 25 is then lifted to elevate the mandrel 30 and return the parts to the positions of FIGS. 1 and 4. The drill string 25 is then rotated at the surface through a small angle, for example, 15°, and another stabbing operation performed.

Eventually, after a sufficient number of angularly spaced stabbing operations, the ball 46 will roll down against the stop screw 62 which is adjacent the cam slot, i.e., into the position of FIGS. 12 and 13. On the next stabbing operation the cam 45 strikes the ball 46 and is deflected by such ball into the position of FIG. 13. Such lateral movement of the cam 45 causes corresponding rotation of the wash pipe 35 and of the interrupter ring 70. The splines 70a of the interrupter ring 70 are thus moved into alignment with the spline ways between the splines 72 in the upper portion of the mandrel 30. Continued lowering of the drill pipe 25 then results in relative travel of the interrupter ring 70 into the upper portion of the mandrel 30, and also results in travel of the upper end of the barrel 33 into the upper portion of the mandrel 30 between the splines 72 thereof. Such relative upward movement continues until the upper end of the interrupter ring 70 strikes the under side of the packing retainer ring 80 at the top of the mandrel 30. The imposed weight then results in relative ascent of the wash pipe 35 within the packing 37 until the upper end of the barrel 33 engages the lower end of the interrupter ring 70. This is the position of FIGS. 2 and 5.

The above described movement has been much more than the relative movement between the interrupter ring 70 and the lower ends of the splines 72 which occurred when the ball 46 was in such position as seen in FIG. 14 and the cam 45 descended straight down to the bottom of its stroke. Such additional movement is characteristically another foot of movement, which is readily detected by the operator at the surface to show that "tripping" of the tool, i.e., registering of the ball 46 with the cam slot 50, has been effected.

Additional angularly spaced stabbing operations are then performed always progressing in the same direction, until, ultimately, the ball 46 rolls away from the screw 62 adjacent the cam slot 50, i.e., rolls out of register with the cam slot, into a position such as that shown in FIG. 14. The operator at the surface now knows that he has rotated the apparatus a little too far and that the highest position of the ball 46 corresponds to a stabbing position somewhat short of the last one. The correct stabbing position has now been located within a small angular range, and further stabbing operations within this range are then performed at smaller angular intervals, e.g., 5°, or less, and always progressing in the same direction, until the stabbing position corresponding to the highest position of the ball 46 has been established with the desired accuracy.

It will be understood that each time the drill string 25 is lifted after tripping of the tool has occurred, i.e., after the cam 45 has been rotated into the position of FIG. 13 by the ball 46, the wash pipe 35 is pulled upwardly by the mandrel 30 and the sub 26 when the retainer ring 80 engages the cocking ring 90, as shown in FIG. 3. Consequently, the cam 45 is moved upwardly through the cam slot 50 and the inclined shoulder or cam wall 96 of FIGS. 12 and 13 is engaged by the foot 95 of the cam 45 and shifted laterally back from the position of FIG. 13 to the position of FIG. 12.

It will be understood that the foregoing description of the operation of the invention applies either to the embodiment of FIGS. 1 to 16, wherein the screws 62 defining stops for the ball 46 are spaced 120° apart, or the embodiment of FIG. 17, wherein the stops 98 are spaced 180° apart.

It is apparent from the foregoing description of the construction and operation that the full orienting cycle may be easily repeated as often as desired until it is assured that the high side of the hole has been established. Also it is apparent that the circulating mud pump may be started as soon as the deflection tool reaches or nears bottom. Of course, as has been previously indicated, the orientation tool depends upon inclination in the hole, such as will cause the ball 46 to roll to the low side. Such inclination is a minimum of around 2°. With the present construction great savings in orienting time result, and orientation is accurate and positive.

The invention claimed is:

1. In combination: telescopically related first and second members relatively movable in the direction of the axis thereof; interengaging means on said first and second members preventing relative rotation thereof about said axis; an arcuate race carried by one of said first and second members and disposed in a plane substantially perpendicular to said axis and having an end; a gravity responsive element movable in said race and engageable with said end thereof; stop means engageable with said first and second members and movable relative thereto between an operative position wherein it limits relative axial movement of said first and second members in one direction to a short stroke and an inoperative position wherein it limits relative axial movement of said first and second members in said one direction to a longer stroke; and cam means connected to said stop means and engageable with said gravity responsive element when said gravity responsive element is in engagement with said end of said race for moving said stop means from said operative position to said inoperative position in response to relative axial movement of said first and second members in said one direction.

2. In combination: telescopically related first and second members relatively movable in the direction of the axis thereof; interengaging means on said first and second members preventing relative rotation thereof about said axis; an arcuate race carried by one of said first and second members and disposed in a plane perpendicular to said axis and having its center on said axis and having an end; a ball movable in said race and engageable with said end thereof; stop means engageable with said first and second members and movable relative thereto between an operative position wherein it limits relative axial movement of said first and second members in one direction to a short stroke and an inoperative position wherein it limits relative axial movement of said first and second members in said one direction to a longer stroke; and cam means connected to said stop means and engageable with said ball when said ball is in engagement with said end of said race for moving said stop means from said operative position to said inoperative position in response to relative axial movement of said first and second members in said one direction.

3. The combination set forth in claim 2 including a third member coaxial with said first and second members and movable axially and rotatable relative to said first and second members, said stop means and said cam means being carried by said third member and said stop means being rotatable between said operative and inoperative positions.

4. The combination set forth in claim 3 wherein said third member is within said first and second members and is tubular.

5. The combination set forth in claim 2 wherein one of said first and second members is provided thereon with longitudinal splines and wherein said stop means is provided thereon with longitudinal splines which are out of alignment with the longitudinal splines first mentioned when said stop means is in said inoperative position and which are in alignment with said first-mentioned longitudinal splines when said stop means is in said operative position.

6. The combination set forth in claim 2 including another cam means carried by that one of said first and second members which carries said race and engageable with the cam means first mentioned for moving said stop means from said inoperative position to said operative position in response to relative axial movement of said first and second members in a direction opposite to said one direction.

7. The combination set forth in claim 2 wherein said race has an angular extent of between about 120° and about 180°.

8. The combination set forth in claim 2 including a third member coaxial with said first and second members and movable axially and rotatable relative to said first and second members, said stop means and said cam means being carried by said third member and said stop means being rotatable between said operative and inoperative positions, that one of said first and second members which carries said race being provided therein with a longitudinal slot which intersects said race adjacent said end thereof and in which said cam means is longitudinally movable in response to relative axial movement of said first and second members, said one of said first and second members which carries said race providing at one side of said slot another cam means engageable by the cam means first mentioned for rotating said stop means from said inoperative position to said operative position in response to relative axial movement of said first and second members in a direction opposite to said one direction.

References Cited in the file of this patent

UNITED STATES PATENTS

| | | |
|---|---|---|
| 2,492,794 | Goble et al. | Dec. 27, 1949 |
| 2,686,660 | Storm | Aug. 17, 1954 |
| 2,691,507 | Brown | Oct. 12, 1954 |